F. H. MOYER.
TIRE MAKING MACHINE.
APPLICATION FILED MAY 21, 1912.
1,252,925.
Patented Jan. 8, 1918.
4 SHEETS—SHEET 1.
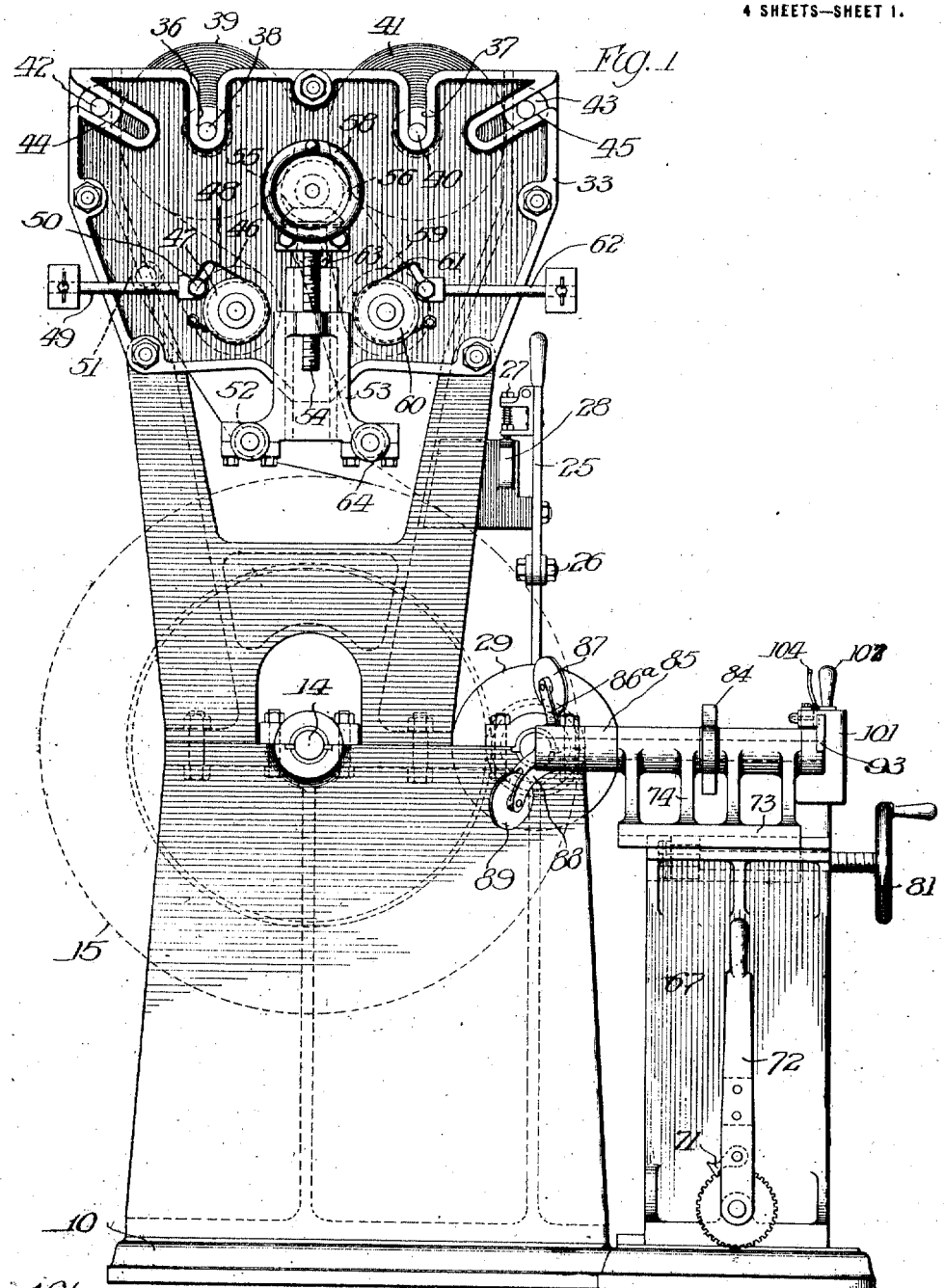

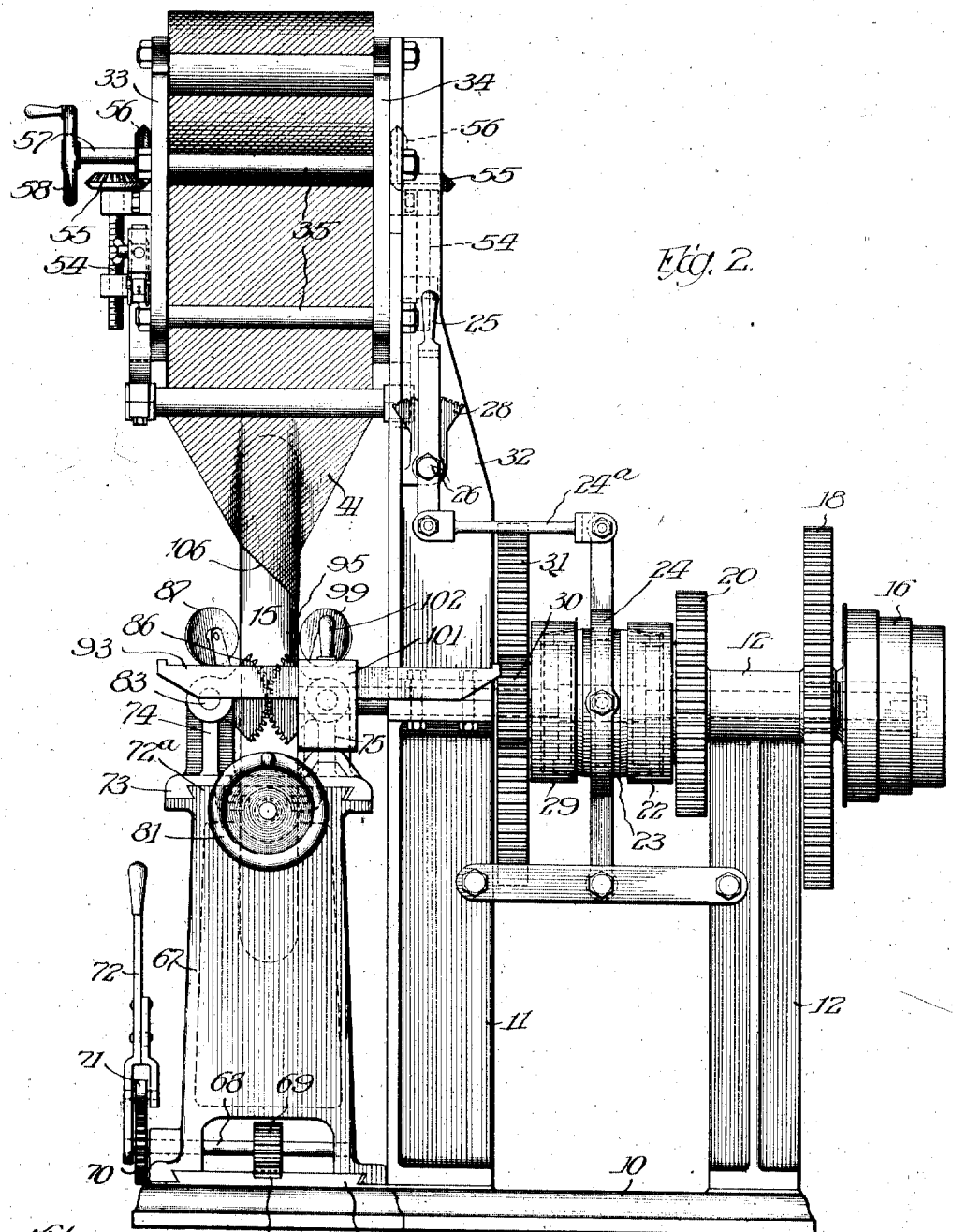

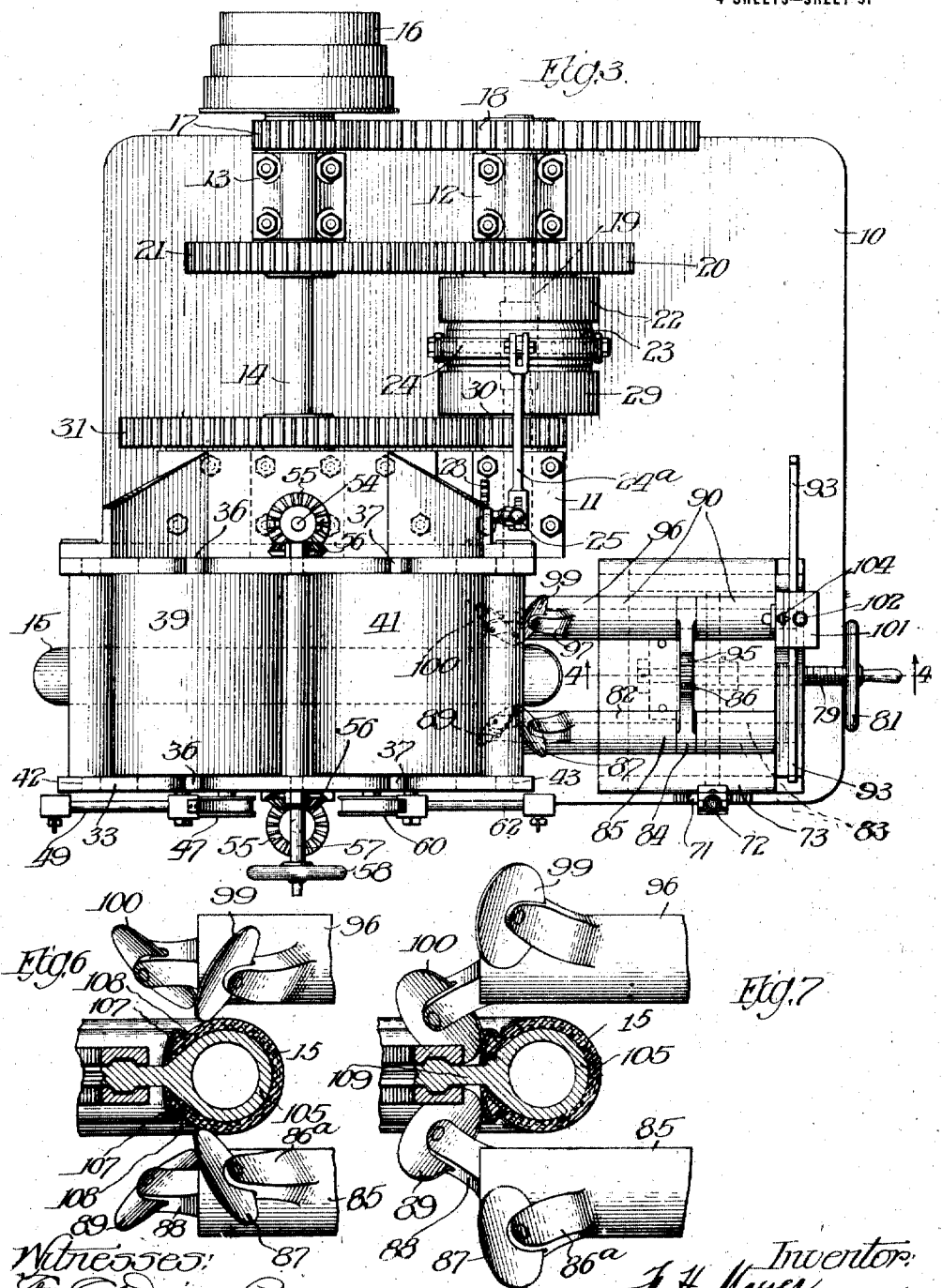

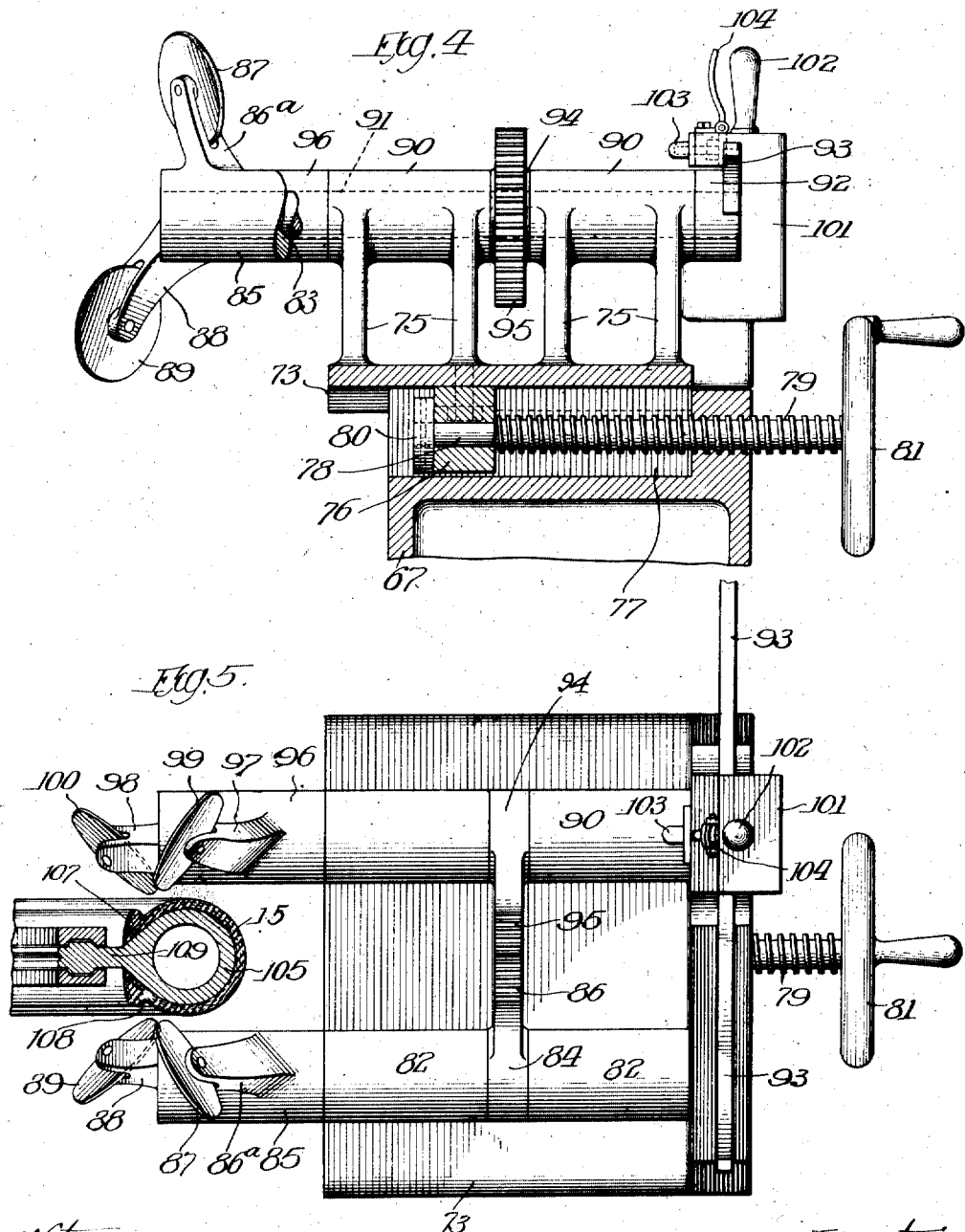

UNITED STATES PATENT OFFICE.

FREDELLIA H. MOYER, OF AKRON, OHIO, ASSIGNOR TO THE FIRESTONE TIRE & RUBBER COMPANY, OF AKRON, OHIO, A CORPORATION OF OHIO.

TIRE-MAKING MACHINE.

1,252,925.   Specification of Letters Patent.   Patented Jan. 8, 1918.

Application filed May 21, 1912.   Serial No. 698,753.

*To all whom it may concern:*

Be it known that I, FREDELLIA H. MOYER, a citizen of the United States, residing at Akron, in the county of Summit, State of Ohio, have invented certain new and useful Improvements in Tire-Making Machines, of which the following is a specification.

My invention refers to tire making machines, and refers particularly to mechanism for applying the fabric as the tire is built up.

According to the methods of operation which have previously been employed, a vehicle tire is built up by applying various layers of fabric to a mold of proper shape. The fabric is preferably cut on the bias so that it will stretch more easily when applied. It will be clear that since the periphery of the tire at its outer surface is of greater length than the inner periphery the fabric must be stretched to a greater extent in some parts than in others. The fabric is ordinarily smoothed into position on the sides of the tire by the use of hand rollers.

It will be evident that by the mode of operation which has just been described the tension applied to the fabric will vary considerably, since the operation is performed entirely by hand and it is impossible for an operator always to apply the same tension in stretching fabric into position.

It is the object of my invention to always employ the same tension in applying the fabric to the mold or form on which the tire is built up, and to also use readily operable means by which the fabric applied to the sides of the tire is quickly and evenly smoothed into position. In carrying out my invention I preferably use two rolls of fabric, this fabric being of the well known type, consisting of canvas or duck to which rubber has been applied. In making up the rolls the fabric is cut on the bias. These rolls are preferably so used in the machine that given strands of fabric in one roll will lie at substantially a right angle to the corresponding strands of the other roll after the fabric has been applied to the tire. The mold or form on which the tire is to be built up is mounted on a suitably driven shaft, and by suitable brakes exactly the same tension is at all times applied to the fabric.

A further important object attained by the employment of two rolls, from which the fabric is taken in alternation, is the saving of material. It is customary to apply one layer of coated fabric peripherally to the tire, the adjacent or meeting ends of the same being cut obliquely of the tire and parallel to each other. The next layer is similarly applied, and the ends are likewise cut, but at an angle to the ends of the preceding layer. If the successive layers be taken, as is usual, from the same roll, a triangular piece of fabric is necessarily cut away in order to reverse the obliquity of the end, and this waste of fabric is of considerable importance. By using in alternation from the two rolls, no re-cutting is required and there is no waste.

A further object of my invention consists in the use of readily operable smoothing disks which are applied to the fabric on the sides of the tire. The disks are mounted on a suitable frame, and as the tire is built up different disks adapted for the particular conformation of the tire may be brought into operation.

These and other advantages of my invention will be more readily understood by reference to the accompanying drawings, which show a preferred embodiment of my invention, and in which:

Figure 1 is a side elevation of my tire making machine;

Fig. 2 is a front elevation of the machine shown in Fig. 1;

Fig. 3 is a plan of the same machine;

Fig. 4 is an enlarged fragmentary vertical section taken on the line 4—4 of Fig. 3;

Fig. 5 is a plan of the parts shown in Fig. 4;

Fig. 6 is a plan of the ends of the disk frame, showing a pair of disks in one operative position; and Fig. 7 is a view similar to Fig. 6, except that a second pair of disks has been moved into operative position.

Carried by the base 10 are the supports 11, 12 and 13. Carried by the supports 11 and 13 is the main driving shaft 14, on one end of which the tire form for the tire 15 is suitably carried. Loosely mounted on the opposite end of shaft 14 is a stepped pulley 16, which is driven from any suitable source of power. Rigidly connected with pulley 16 is the gear 17 in mesh with gear 18 rigidly mounted on the counter-shaft 19. Loosely mounted on the shaft 19 is the gear 20 in mesh with gear 21 rigidly mounted on the shaft 14. Connected with the gear 20 is the clutch member 22, which may be engaged by the tapered clutch 23. The clutch 23 is mounted on shaft 19 to rotate therewith but has longitudinal movement thereof. Clutch 23 is operated through the instrumentality of yoke 24, link 24ª and the lever 25. The lever 25 is pivoted at 26, and is held in adjusted position by the spring operated dog 27, which is adapted to engage one of the teeth of the ratchet 28. Also loosely mounted on the shaft 19 is the clutch member 29, which is rigidly connected with the gear 30. This gear 30 is in mesh with the gear 31 rigidly mounted on shaft 14.

It will now be apparent that as the pulley 16 is rotated, its movement is transmitted through the gears 17 and 18 to the counter-shaft 19. If the clutch 23 is moved to engage the clutch member 22, the gear 20 will be rotated with the shaft 19 and will transmit the movement of the latter to the shaft 14 through the gear 21. The gear 31 rotates with shaft 14 and correspondingly rotates the gear 30 and clutch member 29 loosely mounted on the shaft 19. On account of the fact that the gear 20 is, in the embodiment of the invention herein illustrated, of the same diameter as the gear 21, it will be evident that when the clutch 23 engages the clutch member 22 the shaft 14 will be rotated at the same speed as the counter-shaft 19. On the other hand, if it is desired to rotate the shaft 14 at a slower speed than that of the counter-shaft 19, the clutch 23 is thrown into engagement with the clutch member 29, the clutch 23 being thereby disengaged from the clutch member 22. The gear 30 is thus caused to rotate at the same speed as the counter-shaft 19, and, since this gear is of much smaller diameter than the gear 31, the shaft 14 will be rotated at a correspondingly lower speed. The gear 21, rigidly mounted on shaft 14, causes the rotation of the gear 20 and clutch member 22 on the shaft 19. The rotation of the shaft 14 may, of course, be completely stopped by placing the clutch 23 in its neutral position where it engages neither the clutch member 22 nor the clutch member 29.

Bolted to the support 11 is the bracket 32, to the upper portion of which are fastened the supporting plates 33 and 34 by means of the bolts 35. Each of the plates 33 and 34 is provided with grooves 36 and 37. The grooves 36 are adapted to receive shaft 38 containing the roll of fabric 39, while the grooves 37 are adapted to receive the shaft 40 containing the roll of fabric 41. This fabric consists of duck, canvas, or the like, to which unvulcanized rubber has been applied. According to the usual custom, a strip of cloth is applied as the roll is formed in order to prevent the surfaces of the fabric from sticking to each other. The fabric 39 and 41 is cut on the bias, as clearly shown in Fig. 2, the direction of given strands of the fabric 39 being at substantially a right angle to those of the fabric 41. The rollers 42 and 43 are placed in the slots 44 and 45, and loosely engage the surfaces of the rolls of fabric 39 and 41. The rollers 42 and 43 are for the purpose of deflecting the cloth which is used in forming the rolls of fabric for the purpose of preventing the layers of the latter from sticking to each other.

The fabric 39 is led downwardly around the roller 46 carried by the plates 33 and 34. This roller has a collar 47 which is engaged by the friction brake 48 operated by the weighted arm 49 pivoted at 50. From the roller 46 the fabric 39 passes over the roller 51 and thence over the roller 52 carried on the frame 53, which is vertically movable by means of the screw shafts 54 provided with beveled gears 55 which are engaged by beveled gears 56 mounted on the shaft 57, rotatable by means of the hand wheel 58. The frame 53 is adjusted at the desired height for applying the fabric to the surface of the tire 15.

The fabric 41 is similarly carried around the roller 59 having the collar 60 engaged by the friction brake 61 operated by the weighted arm 62. The fabric 41 then passes over roller 63, and thence over roller 64, carried by the adjustable frame 53. In the representation of my invention shown in Fig. 2, the end of fabric 41 has been applied to the tire 15. The shaft 14 being rotated, the fabric is applied to the tire, the latter, of course, rotating with shaft 14, and a predetermined tension is always exerted on the fabric by means of the brake-controlled roller 59.

I will next describe the mechanism for smoothing the sides of the fabric as the latter is applied to the tire: Carried by the base 10 is the guide member 65, carrying thereon the rack 66. Engaging the guide member 65 is the supporting frame 67, carrying at its lower portion the shaft 68, having thereon the pinion 69, which engages the rack 66. Rigidly mounted on the end of shaft 68 is the circular ratchet 70 engaged by the pawl 71, carried by the lever 72, which is loosely mounted on the shaft 68. It will now be clear that on operation of the lever 72 the supporting frame 67 may be bodily moved toward or away from the tire 15.

Slidably mounted on the guide 72ª on the upper portion of the supporting frame 67 is the bracket base 73, which carries thereon the brackets 74 and 75. Bolted to the bracket base 73 is the lug 76, which projects into the recess 77 formed in the upper portion of the supporting frame 67. Through the lug 76 passes the portion 78 of the screw shaft 79, the retaining disk 80 being applied to the end of the portion 78 of the shaft 79. The opposite end of the shaft 79 has the hand wheel 81, by means of which the shaft may be rotated, thereby moving the bracket base 73 and the various parts carried thereby.

The brackets 74 have formed integrally therewith the bearings 82, through which passes the shaft 83, having rigidly mounted thereon the collar 84 and the sleeve 85. Formed integrally with collar 84 is the gear segment 86, the object of which will presently be described. The sleeve 85 has formed integrally therewith a bracket 86ª carrying the disk 87, and the bracket 88 carrying the disk 89. As is clearly shown in the drawings, the disks 87 and 89 have their axes in planes formed at an angle to each other.

The brackets 75 carry the bearings 90, through which passes the shaft 91, having rigidly mounted on one end the collar 92, which carries the weight rod 93. Between the bearings 90 the shaft 91 carries the collar 94, to which is attached the gear segment 95 which engages the gear segment 86 of the shaft 83. The shaft 91 also has rigidly mounted thereon the sleeve 96 having the brackets 97 and 98, which carry the disks 99 and 100. Disks 99 and 100 are placed in corresponding positions to the disks 87 and 89, but, as will be described hereafter, are adapted for use on the opposite side of a tire.

Carried by the weight rod 93 is the weight 101, having the handle 102. The weight 101 may be placed at any desired position on the weight rod 93, being held in adjusted position by the locking member 103, which is disengaged by locking lever 104 when it is desired to move the weight 101. Referring to Fig. 2, it will be clear that if the weight 101 is moved to a position to the left of the collar 92, the shaft 91 will thereby be rotated in a contra-clockwise direction, and will cause the shaft 83 to be rotated in a clockwise direction by means of the coöperative action of the gear segments 86 and 95. In this way the disks 87 and 99 will be brought into engagement with the sides of the tire 15, which is held on the form 105. This position of the disks is indicated in Fig. 6.

Let us now assume that the weight 101 is moved to the right of the collar 92, according to the representation of Fig. 2. The shaft 91 will now be rotated in a clockwise direction, and the shaft 83 will be rotated in a contra-clockwise direction, thus bringing the disks 89 and 100 into contact with the tire 15. This position of the parts is shown in Fig. 7. The pressure with which the disks may be brought in contact with the tire may be regulated by the position to which the weight 101 is moved on the weight rod 93.

Having thus described the various parts used in my invention, its operation may now be readily understood: The mold or form 105 being secured to the end of shaft 14 in the well known manner, the end of fabric 41 is applied to the form in the manner indicated in Fig. 2. The clutch 23 is now brought into engagement with one of the clutch members 22 or 29 in order to cause the rotation of the shaft 14 at the desired speed. As the form 105 is rotated the fabric 41 is applied to the latter, the tension being regulated by the roller 59. The disks 87 and 99 are moved into contact with the sides of the fabric 41 as it is applied to the form 105, the pressure of these disks being regulated by the position of the weight 101, which is placed to the left of the collar 92, according to the representation shown in Fig. 2. When the form 105 has been rotated through one revolution, the fabric 41 which has been cut obliquely before its application to the form, is allowed to slightly overlap the edge 106, shown in Fig. 2. The rotation of the form 105 is continued, and by means of hand wheel 81 the disks 87 and 99 are gradually moved inwardly along the sides of the fabric 41 until the latter has been smoothed into the desired position.

When this operation has been completed, a layer of fabric 39 is next applied to the tire, the oblique end of this fabric being at substantially a right angle to that of the fabric 41. The same cycle of operations which has just been described is now repeated for the application and smoothing into position of this layer of fabric.

A certain desired number of layers of fabric are thus applied from the two rolls in alternation; this in order that the oblique junction of the ends of successive layers shall be at an angle to each other, and that such reverse obliquity shall be obtained without waste. Thereupon the beads 107 (as shown in Figs. 6 and 7) are now applied. On application of the next succeeding layer of fabric, the disks 87 and 99 are used to smooth the sides of the fabric until the peripheries of these disks are brought into the angles 108, shown in Figs. 6 and 7.

It will now be evident that if these disks were moved inwardly farther they would tend to displace the beads 107 from position. The weight 101 is now moved to the right of the collar 92, so that the disks 89 and 100 are brought into operative position, as indicated in Fig. 7. These disks engage the fabric at positions adjacent the base 109 of the form 105, and thus serve to smooth the fabric without displacing the beads 107.

Successive layers of fabric are applied, and are smoothed into position by the pair of disks 87 and 99 and the pair of disks 89 and 100, in the manner described, until the various fabric layers of the tire have all been applied.

It will be clear to those skilled in the art that by means of my invention great rapidity of operation is possible, while at the same time a uniform product is obtained on account of the uniformity of tension in applying the fabric and uniformity of pressure in smoothing the latter into position. Many changes may be made in the detailed construction of the parts which I have described without departing from the spirit or scope of my invention.

What I claim is:

1. In a tire making machine, the combination of means for rotating a tire form, means for applying fabric to said form, a pair of smoothing members adapted to be applied to opposite sides of said form, means for simultaneously bringing said members into engagement with the fabric on the sides of said form, means common to both for maintaining said members in contact with the fabric on said form, and means for adjusting the radial position of said members with relation to said form, substantially as described.

2. In a tire making machine, the combination of means for rotating a tire form, means for applying fabric to said form, a pair of smoothing disks adapted to be applied to opposite sides of said form, means for simultaneously adjusting the positions of said disks in unison, and means common to both for maintaining said disks in contact with said form, substantially as described.

3. In a tire making machine, the combination of means for rotating a tire form, means for applying fabric to said form, a pair of smoothing disks adapted to be applied to opposite sides of said form, means for simultaneously adjusting the positions of said disks in unison, and unitary gravity means for maintaining said disks in contact with said form, substantially as described.

4. In a tire making machine, the combination of means for rotating a tire form, means for applying fabric to said form, a first set of smoothing means for engaging the fabric on the sides of said form, a second set of smoothing means for engaging the fabric on the sides of said form, the axes of the first set of smoothing means being in different planes from the axes of the second set of smoothing means, means for selectively bringing either of said sets of smoothing means into engagement with the fabric on the sides of said form, and means for maintaining equal pressures on both of the smoothing means of the set in engagement with the fabric on said form, substantially as described.

5. In a tire making machine, the combination of means for rotating a tire form, means for applying fabric to said form, a first set of smoothing means for engaging the fabric on the sides of said form, a second set of smoothing means for engaging the fabric on the sides of said form, the axes of the first set of smoothing means being in different planes from the axes of the second set of smoothing means, means for selectively bringing either of said sets of smoothing means into engagement with the fabric on the sides of said form, and means for adjusting the radial positions of said sets of smoothing means with relation to said form, substantially as described.

6. In a tire making machine, the combination of means for rotating a tire form, means for applying fabric to said form, a first pair of smoothing disks for engaging the fabric on the sides of said form, a second pair of smoothing means for engaging the fabric on the sides of said form, said first pair of disks being located in different planes from said second pair of disks, means for selectively bringing either of said pairs of disks into engagement with the fabric on the sides of said form, and means for adjusting the radial position of said disks with relation to said form, substantially as described.

7. In a tire making machine, the combination of means for rotating a tire form, means for applying fabric to said form, a first pair of smoothing disks for engaging the fabric on the sides of said form, a second pair of smoothing means for engaging the fabric on the sides of said form, said first pair of disks being located in different planes from said second pair of disks, means for selectively bringing either of said pairs of disks into engagement with the fabric on the sides of said form, and gravity means for maintaining either of said pairs of disks in engagement with the fabric on the sides of said form, substantially as described.

8. In a tire making machine, the combination of means for rotating a tire form, means for applying fabric to said form, a pair of rotatable disk shafts, a pair of smoothing disks carried by each shaft, means connecting said shafts whereby they may be simultaneously rotated in opposite directions, said disks adapted to engage opposite sides of the fabric on the tire form, and means for maintaining said disks in contact with said fabric, substantially as described.

9. In a tire making machine, the combination of means for rotating a tire form, means for applying fabric to said form, a pair of rotatable disk shafts, a pair of smoothing disks carried by each shaft, means connecting said shafts whereby they may be simultaneously rotated in opposite directions, said disks adapted to engage opposite sides of the fabric on the tire form, means for maintaining said disks in contact with said fabric, and means for adjusting the radial position of said disks with relation to said tire form, substantially as described.

10. In a tire making machine, the combination of means for rotating a tire form, means for applying fabric to said form, a pair of rotatable disk shafts, a pair of smoothing disks carried by each of said shafts, the disks on each shaft being located in different planes, means connecting said shafts whereby they are simultaneously rotated in opposite directions, and gravity means whereby corresponding disks on said shafts may be brought into contact with the fabric on the sides of said form and maintained in engagement therewith, substantially as described.

11. In a machine for making tires, the combination with a revoluble core, a mechanism for applying the fabric over the major portion of the tire and on the under side of the bead, means for causing the mechanism to traverse the side of the core, the working face of said mechanism during the major portion extending in one direction from the tire, and during the remainder, extending in a different direction, and a swivel mounting for said mechanism, whereby the change in direction may be accomplished.

12. In a machine for making tires, the combination with a revoluble core of two mechanisms one on each side of the core for applying the fabric on respective sides of the core over the major portion of the tire and on the under side of the bead, the working face of each mechanism during the major portion extending in one direction from the tire, and during the remainder extending in a different direction, and a single pressure means to hold both applying mechanisms against the core during the entire operation of the fabric applying means.

13. In a tire-making machine, the combination of a revoluble core, fabric applying mechanisms at the sides of the core, comprising disks adapted to smooth and shape the fabric to the core, said disks being at different angles to the core when shaping the fabric to the core and when shaping the fabric under the bead, swivel mountings for said disks whereby the change in angle may be effected, and means for causing the fabric applying mechanisms to traverse the side of the core.

FREDELLIA H. MOYER.

Witnesses:
W. C. STEVENS,
W. B. CALLEM.